United States Patent [19]
Schiavo et al.

[11] Patent Number: 5,609,757
[45] Date of Patent: Mar. 11, 1997

[54] HOUSING ASSEMBLY FOR THE FILTRATION OF CORROSIVE LIQUIDS AND A METHOD FOR TEMPORARY SEALING OF A HOUSING ASSEMBLY

[75] Inventors: John J. Schiavo, Santa Clara; Robert G. Garber, San Jose, both of Calif.

[73] Assignee: Hytec Flow Systems, San Jose, Calif.

[21] Appl. No.: 193,691

[22] Filed: Feb. 8, 1994

[51] Int. Cl.$^6$ ................................. B01D 27/08
[52] U.S. Cl. ................ 210/232; 210/450; 210/453; 210/455; 55/502; 55/503
[58] Field of Search ................... 210/232, 450, 210/453, 455, 436, 198.2; 55/502, 503

[56] References Cited

U.S. PATENT DOCUMENTS

| | | | |
|---|---|---|---|
| 3,966,609 | 6/1976 | Godbille et al. | 210/198.2 |
| 4,080,294 | 3/1978 | Edwards et al. | 210/232 |
| 4,806,238 | 2/1989 | Sattler et al. | 210/198.2 |
| 4,876,005 | 10/1989 | America | 210/198.2 |
| 4,880,536 | 11/1989 | Haraveth et al. | 210/232 |
| 5,114,572 | 3/1992 | Hunter et al. | 210/450 |
| 5,194,225 | 3/1993 | Müller et al. | 210/198.2 |
| 5,342,519 | 8/1994 | Friedmann et al. | 210/232 |

*Primary Examiner*—John Kim
*Attorney, Agent, or Firm*—Hans J. von der Pfordten

[57] ABSTRACT

A filter housing assembly for the filtration of liquids at high temperature and high pressure and for reduction of particles having a housing for a filter cartridge, a flanged cap, that is slidingly inserted into the housing, and having a cap nut for fastening and tightly sealing the cap to a lip on the housing. The interface housing-cap having grooves, with centerlines offset in opposite directions, for receiving sealants and cone-shaped surfaces on the flange and the lip opposing flat surfaces on the cap nut and the flange, respectively, for achieving a tight seal. The housing having a bottom with a concentric cylindrical recess with a concave-convex edge for receiving the nose of the cartridge. The housing also having a spacer for holding the upper part of the cartridge concentric for efficient filtration.

11 Claims, 6 Drawing Sheets

HOUSING ASSEMBLY FOR THE FILTRATION OF CORROSIVE LIQUIDS AND A METHOD FOR TEMPORARY SEALING OF A HOUSING ASSEMBLY

BACKGROUND

1. Field of the Invention

The present invention generally relates to the filtering of liquids and more specifically to the filtration of high temperature, high pressure etching liquids primarily used in the processing of semiconductor devices and requiring an extremely low particle count and very high reliability.

2. Description of the Prior Art

Presently available filter housing assemblies use cartridges inserted into a cylindrical housing with a twist-screwtop to tighten an O-Ring against the housing flange for generating a sealed unit with an inlet and an outlet for the liquid to be filtered. Some assemblies are molded in one piece as a throw-away unit. The liquid enters under pressure through the inlet into the space between the housing and the cylindrical filter cartridge and is forced through the filter. The filter surrounds a concentric cylindrical space through which the filtered liquid exits from the outlet at the bottom of the filter housing. The filter cartridge is closed off at its top and has a nose at its bottom, surrounded by O-rings, by which the cartridge is held in the bottom recess of the filter housing. Potential shortcomings of the filter housing are damage to the O-ring because of twisting, deforming and abrasive action during screw-on closure, which can contribute to leakage and a decrease in filtration efficiency.

Usually the cartridge is inserted and held only at the housing bottom by two parallel O-rings around the cartridge nose. The filter cartridge may tilt as a consequence of fluid pressure action and no longer be concentric with the filter housing, causing an uneven flow through the cartridge. This action also may contribute to lower filtration efficiency and a higher particle count by uneven filtration or by bypassing of the filter as well as to lower filter cartidge life. Together with the used cartridge filter housings are customarily thrown away, amounting to economical and environmental waste.

Large cross-section vent tubes have been used to maintain an air-cushion in the housing cap for pressure variation dampening, which leads to a sizable amount of liquid being forced out the vent tube back to a pump, decreasing the filtration efficiency.

SUMMARY OF THE INVENTION

It is therefore an object of the present invention to provide a housing assembly design, made out of a suitable plastic like "TEFLON" (R), for the prevention of leaks, even at temperatures in the range of 190 degrees Celsius (375 degrees F.) and at pressures as high as 5 bars (70 psi), for even flow characteristics throughout the life of the filter cartridge and for creating an extremely low particle count.

Briefly, a preferred embodiment of the present invention includes a filter housing, with a lip around its opening carrying an outside thread and a recess for receiving a spacer ring, holding the upper portion of a filter cartridge concentrically with the housing, that does not inhibit the fluid flow around the cartridge.

It also includes a slide-on cap, with a concentric flange and O-rings on the face of its opening, that is fastened to the housing by a separate screw-on cap nut with an inside thread, engaging the flange and the outside thread on the lip of the housing. The upper surfaces of the flange and the lip are angled for generating tight seals. The cap contains an opening for the insertion of a vent tube with a very small cross-section which enforces a certain liquid level in the housing to generate an air space on top of the cartridge within the cap. This air space serves as a damper for pressure variations generated by the pump feeding the filter housing assembly. The cross-section of the vent is very small compared to the filter area resulting in a very small leakage volume which is fed back to the intake of the pump feeding the filter.

The upper rim portion of the bottom recess of the filter housing is slightly conically wider than its cylindrical portion to facilitate the insertion of the cartridge without damage to the filter nose O-rings, thus preventing the O-rings from rolling, twisting and experiencing uneven deformation for minimizing the generation of particles and for preventing bypass flow.

An advantage of the present invention is that the cap is inserted into the housing by a sliding action, avoiding a twisting and abrasive action on the O-Rings that provide a seal between the cap and the housing.

Another advantage of the present invention is the provision of a tight seal between the filter housing and the cap even at higher temperatures and pressures by using semicircular grooves with offset centerlines in opposing surfaces between cap and housing. A seal is accomplished by pushing a concentric O-Ring of circular cross-section against an inner surface of a semicircular groove cross-section on one part (for example on the cap) and against an outer surface of a semicircular groove cross-section of the opposing part (for example on the housing).

Another advantage of the present invention is the use of two concentric coplanar O-Rings of different diameters as sealants between cap and housing in the previously described fashion with opposing offset centerlines of the grooves. For example, by pushing on the cap the smaller diameter O-Ring against the inner surface of its semicircular groove cross-section and the larger diameter O-ring against the outer surface of its semicircular groove cross-section and with the inner and outer surfaces reversed on the matching plane of the housing an additional improvement of the sealing capability at high temperatures and pressures is achieved.

Another advantage of the present invention is the provision of an bottom recess with a concave groove around its edge within the filter housing for easy insertion of the filter cartridge nose without damage to its O-rings, like abrasion, rolling or twisting, for preventing the generation of particles and bypass flow.

Another advantage of the present invention is the provision of a circular spacer around the top of the filter cartridge asserting its concentric positioning, thus providing an even liquid flow through the filter and preventing tilting of and damage to the cartridge nose O-rings.

Another advantage of the present invention is a slightly cone-shaped surface of the opening of the housing facing a flat surface of the flange around the cap asserting a tight seal when the cap nut is tightened between cap and housing, even at high temperatures and pressures.

Another advantage of the present invention is the formation of an air space by a vent tube through the cap for the dampening of pressure variations generated by the pump feeding the filter and for maintenance of a minimum liquid level around the filter cartridge, thus contributing to an efficient filtration and a low particle count.

Another advantage of the present invention is the reusability of the filter housing with a new filter cartridge.

DETAILED DESCRIPTION OF THE PREFERRED EMBODIMENTS

The filter housing assembly according to the present invention can be implemented as housing assembly 10, made out of a suitable plastic like "TEFLON" described in the following and depicted in FIGS. 1, 3 and 4.

Figure 1:
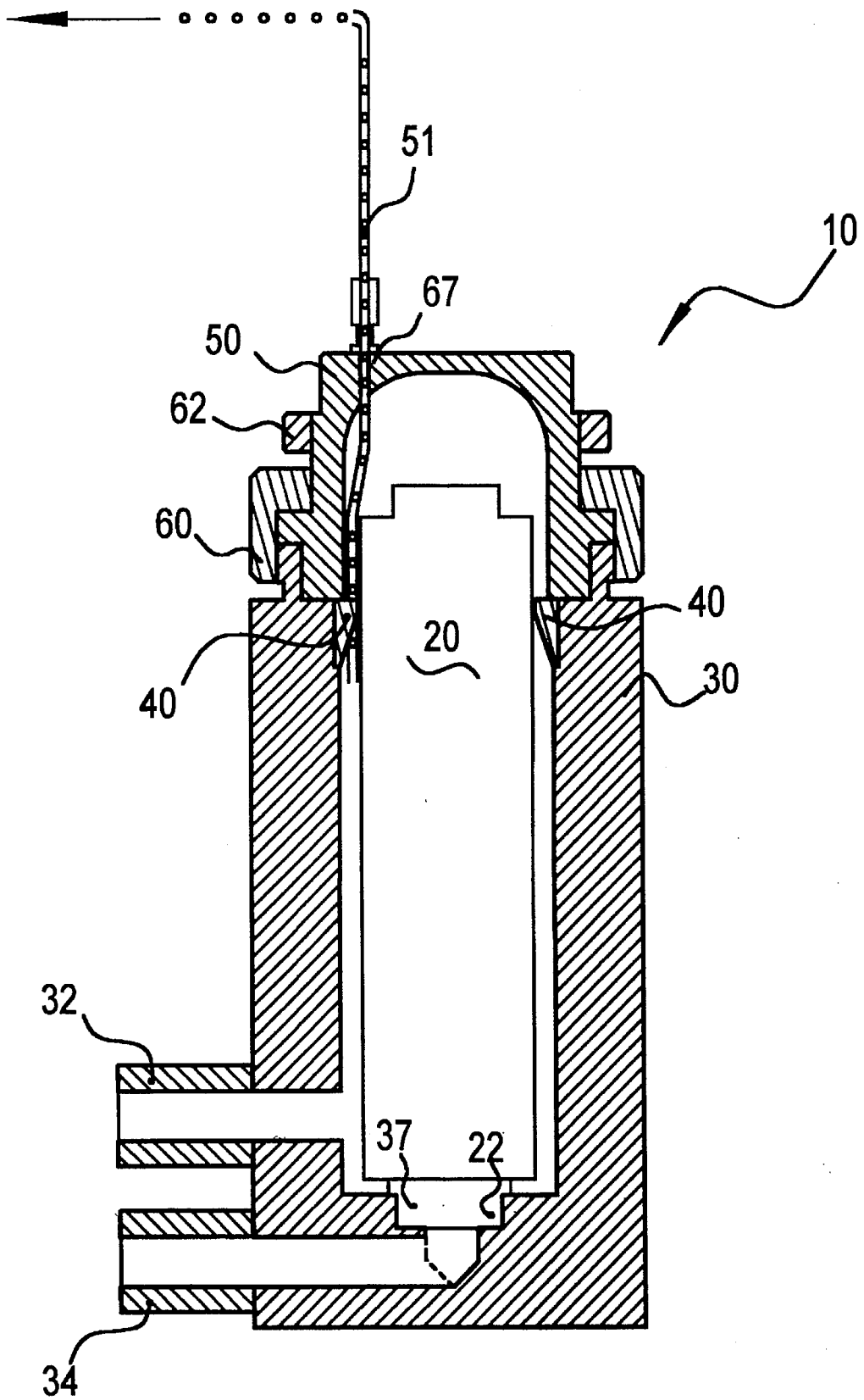
FIG. 1 is a cross-section overview of a preferred embodiment of a filter housing of the present invention.

Referring to FIG. 1, housing assembly 10 comprises a filter cartridge 20, housing 30, spacer ring 40, cap 50 with vent tube 51, cap nut 60 and retaining ring 62.

Figure 2:
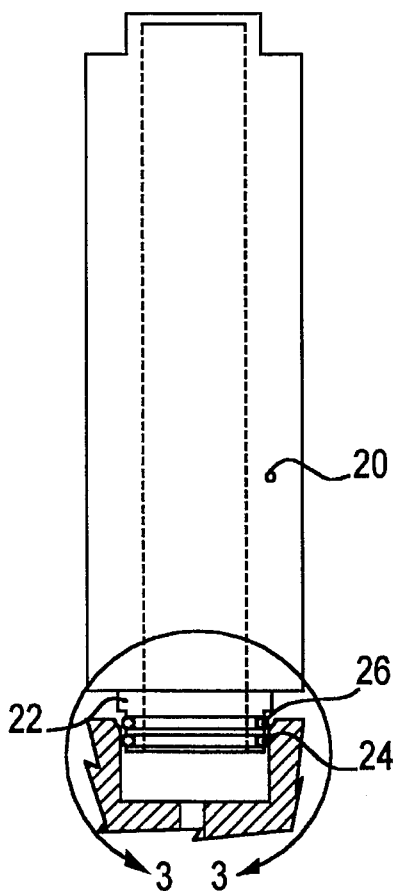
FIG. 2 is a cross-section of a prior-art commercial filter cartridge.

Commercially available cylindrical filter catridge 20, as depicted in FIG. 2, is closed at its top and encloses a concentric cavity with nose 22 at its lower end, through which the filtered liquid exits in a downward direction. Nose 22 customarily has two parallel O-rings 24 and 26 concentrically attached around its cylindrical face for a sealing seating within housing 30. Housing 30 has a cup-shape for receiving in its cavity and holding cartridge 20. As depicted in FIG. 1 at its lower portion housing 30 carries inlet 32 in the form of a radially oriented flange acting as inlet for a contaminated liquid into the cavity of housing 30. Outlet 34 is a radially oriented flange located below inlet 32 and acts as drain of filtered liquid out of the inner cavity of cartridge 20 via housing 30. The bottom of the cavity of housing 30 is shaped as a concentric cylindrical recess 37 for receiving nose 22 of cartridge 20.

Figure 3:
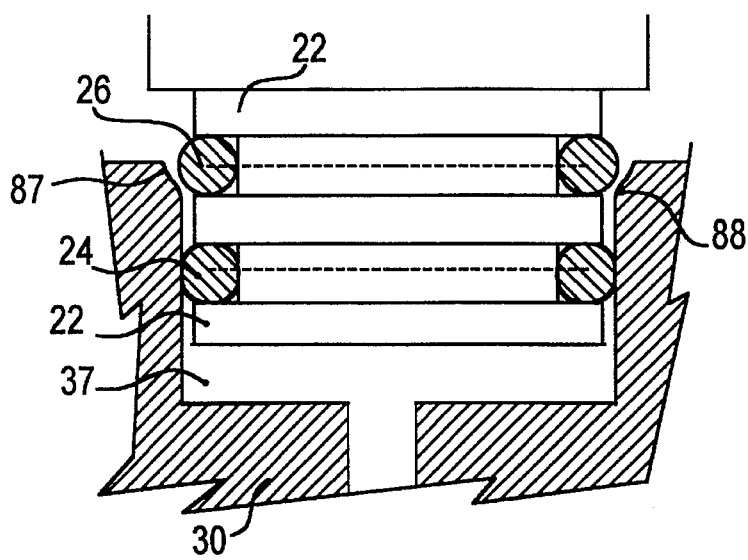
FIG. 3 is a cross-section of the concentric alignment recess for the cartridge nose.

As illustrated in FIG. 3 the edge of recess 37 is formed as zone 87,88 with an S-shaped cross-section with a concave portion 87 having a circular cross-section with the radius of its center being slightly larger than the radius of the O-rings 24 and 26 around nose 22 of cartridge 20. The concave portion 87 of said zone 87,88 accepts the lower O-ring 24 of nose 22 and centers it before its compression by being pushed down through a convex portion 88 of said zone 87,88 into the cylindrical portion of recess 37. Continued pushing down of cartridge 30 repeats the alignment and compression procedure for O-ring 26. This method avoids the twisting and rolling of O-rings which is conducive to leakage and particle generation. When the nose 22 of cartridge 20 is seated in the cylindrical portion of recess 37 of housing 30 a dual seal of compressed O-rings 24 and 26 of cartridge 20 against housing 30 separates the inflowing liquid from the outflowing liquid. The seating of nose 22 within recess 37 also holds the lower end of cartridge 20 concentric within housing 30.

Figure 4:
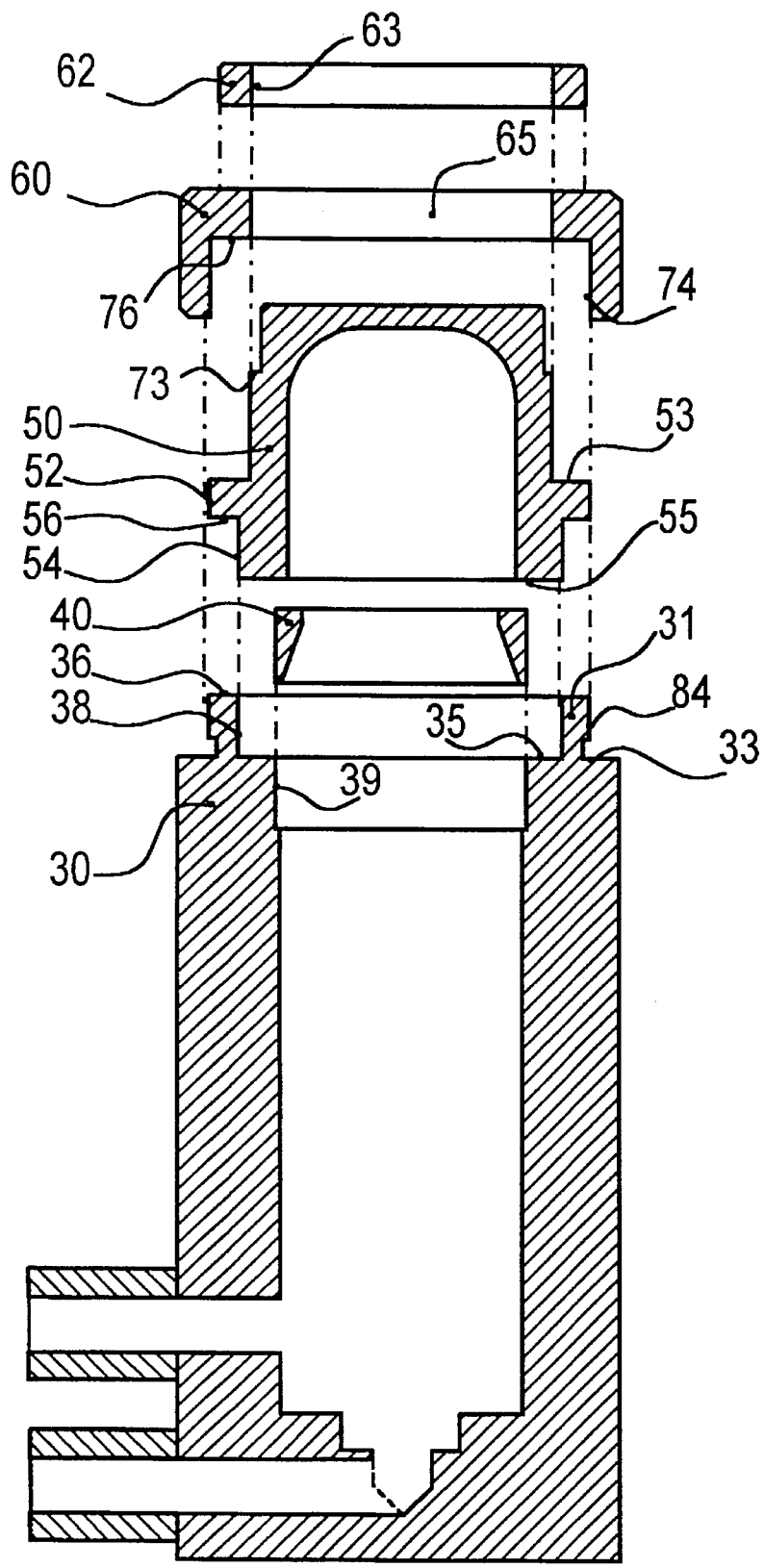
FIG. 4 is a cross-section of cap and housing detail illustrating offset sealing.
Figure 5:
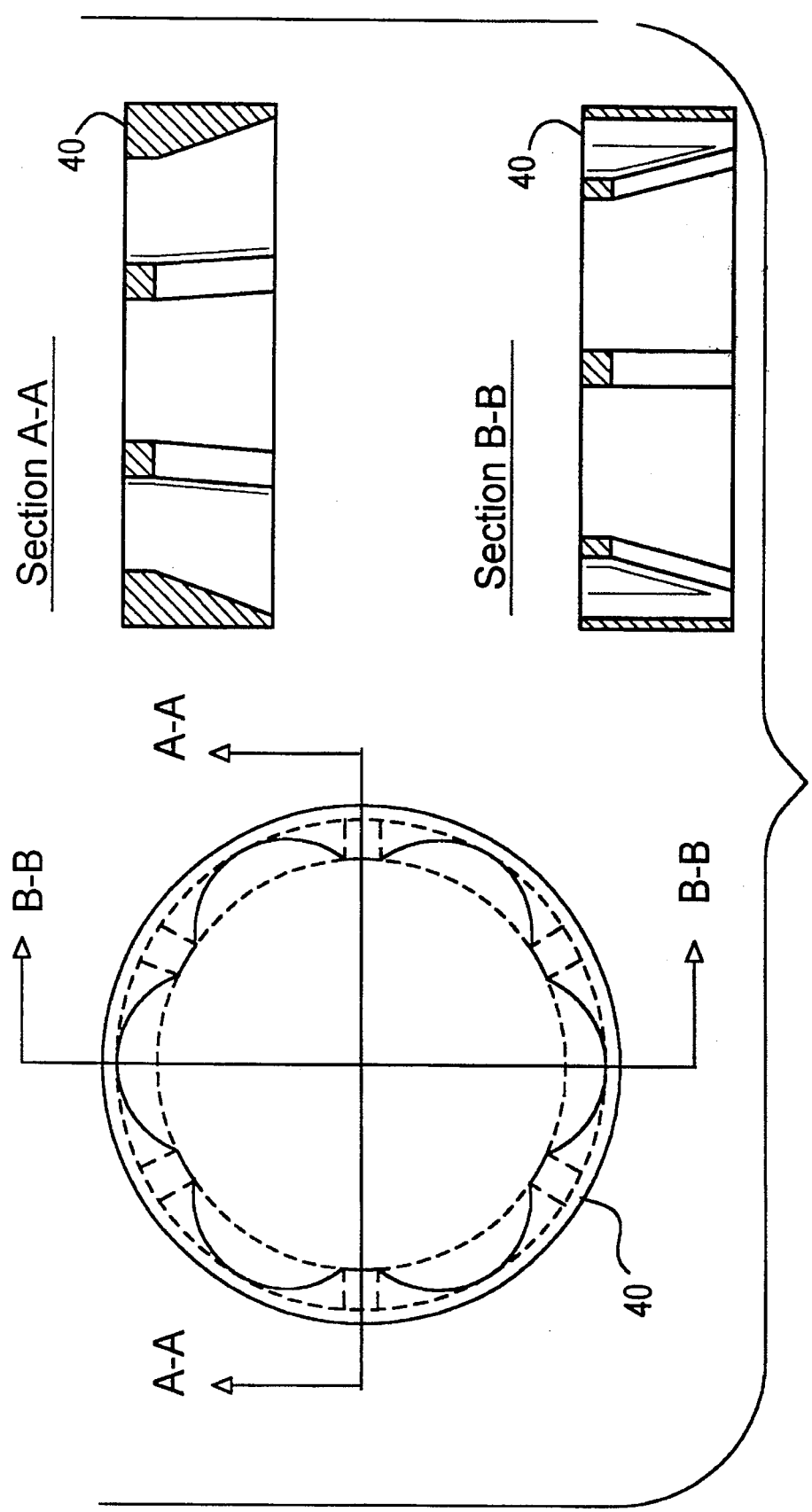
FIG. 5 is a cross-section of a spacer.
Figure 6:
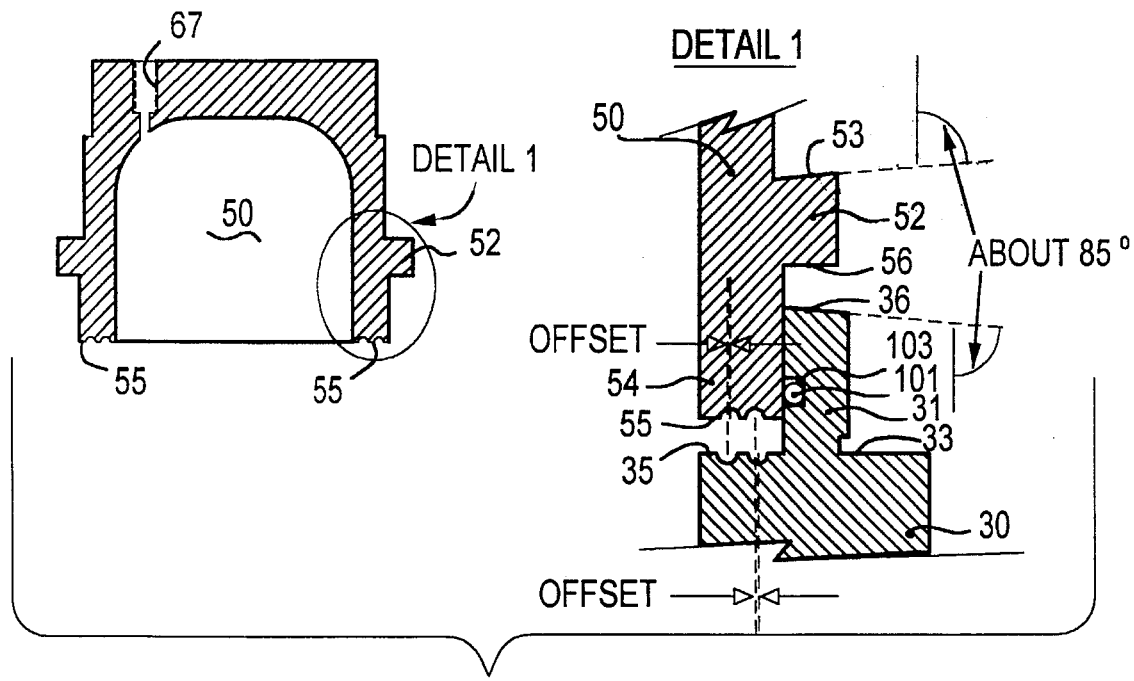
FIG. 6 is a cross-section of a cap.

FIG. 4 shows housing 30 having a lip 31 with an outside recess 33 carrying outside thread 84. Housing 30 has at its mouth an upper concentric larger radius recess 38 and a lower concentric smaller radius recess 39. Recess 39 is suitable for receiving spacer ring 40. As illustrated in FIG. 6 lip 31 has an upper annular surface 36 shaped as a partial concentric cone with its apex pointing upward describing an upwardly acute angle of about 85 degrees with the center axis. FIG. 5 shows spacer ring 40 which has a flared cross-section with its inner radius being equal to the radius of cartridge 20 and serves as a flow-through spacer. It carries several channels for the liquid in the form of coaxial or slanted hollow segments around its circumference, the apexes of which touch cartridge 20 to hold its upper end concentric within housing 30 in order to provide an even vertical and radial flow for the liquid. Recess 38 inside lip 31 is suited for receiving cap 50.

Cap 50, as depicted in FIG. 4 and detailed in FIG. 6, is cup-shaped with a radial flange 52, having an annular upper surface 53, shaped as a partial concentric cone with its apex pointing downward describing a downwardly acute angle of about 85 degrees with the center axis, and a lower flat surface 56, and having a concentric stub 54 with a flat surface 55 at the mouth of cap 50. Flange 52 is thicker at the outside perimeter of surface 53 than at the inside perimeter of surface 53. Cap 50 has a concentric outside thread 73 in its upper part for receiving concentric inside thread 63 of retaining ring 62 which holds cap nut 60 slidingly attached to cap 50.

Cap nut 60 has an opening 65, to be slid over cap 50, a recess 76 to engage annular flange surface 53 when stub 54 of cap 50 is inserted into recess 38 of housing 30, and inside thread 74 which engages outside thread 84 of lip 31 when cap nut 60 is used to fasten cap 50 slidingly to housing 30. The mouth of cap nut 60 fits into recess 33 when cap nut thread 74 engages thread 84 of lip 31. The generated axial pressure is equally distributed around the outer perimeter of flange surface 53 by its minute deformation, which in turn causes a minute deformation of the inner perimeter of lip surface 36 for a tight seal with cap flange surface 56.

Figure 8:
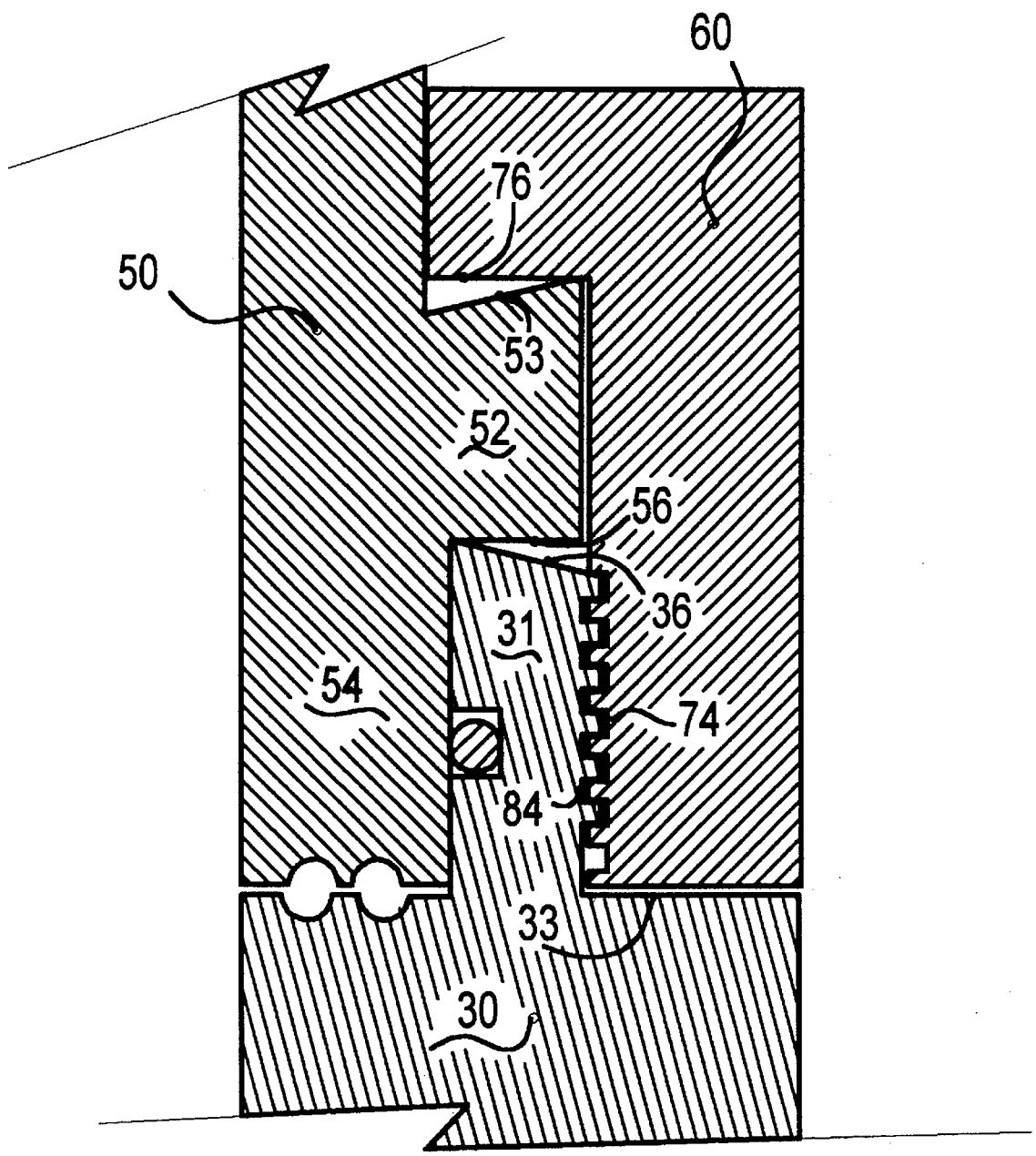
FIG. 8 is a cross-section of the seal housing, cap and cap nut.

Referring to FIGS. 1, 6 and 8, when hot liquid enters housing 30, originally at room temperature, cap stub 54 heats up first and expands in all directions, but mostly axially. Since the inside thread 74 of cap nut 50 is engaging thread 84 of lip 31, the outer perimeter of surface 53 is more deformed pushing against recess 76. The omnidirectional heat expansion of flange 52 causes its lower surface 56 to push against and increasingly to deform the inner perimeter of surface 36, thus reinforcing a tighter seal between lip 31 and flange 52. This sealing action is enhanced when lip 31 reaches thermal equilibrium and pushes the inner perimeter of its surface 36 even more against lower surface 56 of flange 52 for additional deformation.

Figure 7:
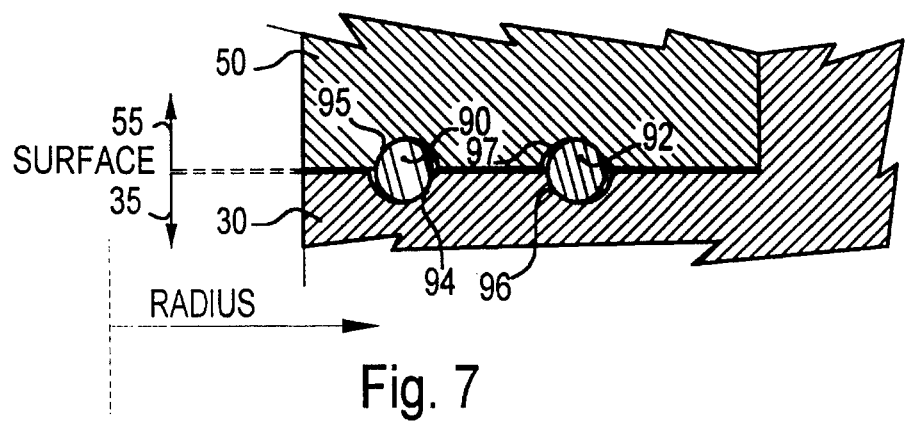
FIG. 7 is a cross-section of the offset O-ring seal between cap and housing.

Stub 54 is shaped to be slidingly inserted into recess 38 where a surface 35 and a surface 36 of housing 30 oppose a surface 55 of concentric stub 54 and a surface 56 of flange 52, respectively. FIGS. 6 and 7 depict the details of the housing 30-cap 50 interface. Groove 94 on surface 35 has a semicircular cross-section and a cencentric groove centerline with a radius slightly different (smaller in FIG. 7) from the radius of a groove centerline of a corresponding semicircular groove 95 on surface 55. In an analogous way, semicircular groove 96 on surface 35 has a concentric groove centerline with a radius slightly different (larger in FIG. 7) from the radius of a groove centerline of a corresponding semicircular groove 97 on surface 55, but here the radial difference of groove pair 96,97 is in the opposite direction compared to that for groove pair 94,95 as illustrated in FIG. 6. An "offset" seal between surface 55 and surface 35 is accomplished by lying concentric O-rings 90 and 92 into respective grooves 94 and 96 on surface 35 of housing 30, by subsequently pressing facing surfaces 35 and 55 of the housing-cap interface against each other after inserting cap 50 into the recess 38 of housing 30 and by screwing thread 74 of cap nut 60 into thread 84 of housing 30. As depicted in FIG. 6 this action pushes the concentric O-Ring 90 of circular cross-section against the outer semicircular groove surface of groove 94 on surface 35 of the lip 31 and simultaneously against the inner semicircular groove surface of groove 95 on the opposite surface 55 of stub 54, thus providing a tight seal. Concurrently this action pushes the concentric O-Ring 92 of circular cross-section against the inner semicircular groove surface of groove 96 on surface 35 and simultaneously against the outer semicircular groove surface of groove 97 on the opposite surface 55. In this fashion O-ring 92 provides a tight seal in the opposite direction compared to the seal generated by O-ring 90. Lip 31 also has a concentric recess 103 for receiving O-ring 101, which is compressed when stub 54 is inserted into recess 38 of housing 30, and which serves as an added protection against leaks and for trapping and maintaining an air-cushion in the dome of cap 50.

During assembly and after the insertion of spacer 40 into recess 39, as illustrated in FIG. 4, stub 54 is inserted into recess 38 and cap nut 60 is slid over cap 50 to fasten it to housing 30 with thread 74 engaging thread 84, retaining ring 62 carrying inside thread 63 is slid over the closed end of cap 50 to hold cap nut 60 attached to cap 50 with thread 63 engaging thread 73.

Referring to FIG. 1, vent tube 51 is vented to an open air reservoir and serves as a means to maintain a certain liquid level in housing 30 inspite of fluctuations in the inlet pressure due to pump action and consequently stabilizes fluctuations in the liquid level. In the first instance of operating the filter housing assembly 10 after assembly, air is pushed out through vent tube 51 until the rising liquid level reaches the orifice of vent tube 51. This action traps an air cushion in the dome of cap 50 which buffers pressure variations of the liquid. When the liquid level in housing 30 rises higher, the compressed air in the dome of cap 50 opposes the action. The liquid path cross-section of vent tube 51 is very small in comparison to that of filter cartridge 20 causing only an insignificant amount of liquid to be forced out by the over-pressure in housing 30 through vent tube 51, which is screwed into thread 67 in the dome of cap 50. Vent tube 51 empties into an open air reservoir at the intake of a pump feeding the liquid into housing assembly 10.

Although the present invention has been described in terms of the presently preferred embodiment, it is to be understood that such disclosure is not to be construed as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A housing assembly (10) for the filtration of liquids, aligned substantially in a vertical position, with a cavity for temporarily holding a replaceable cylindrical filter cartridge (20) having a lower open end nose (22) with at least one O-ring (24) attached, comprising, in combination:

a cup-shaped cap (50) with an outside thread (73) near its closed end and having a radial flange (52) with an upper annular surface (53) and a lower annular surface (56) and with a concentric stub (54), with said stub having a first planar surface (55) on its mouth with at least one concentric groove (95) for receiving at least one O-ring (90);

a cup-shaped housing (30) with an annular cross-section for receiving the cartridge (20) to form a closed sealed cavity with the cap (50) in a top position, to allow the formation of an air pocket in said cavity above the cartridge (20) for dampening pressure variations in said liquid, the housing having an inlet (32) and an outlet (34) for a liquid and having at its mouth a lip (31) with a concentric outside thread (84) and having at its mouth an upper annular surface (36) and an upper, larger radius first recess (38) and a lower, smaller radius second recess (39), said first recess (38) being suitable for slidingly receiving said stub (54) of the cap (50) with a second planar surface (35) of said first recess (38) opposite said first planar surface (55) of the cap having correspondingly at least one matching concentric groove (94) for receiving said O-ring (90), and having a bottom recess (37) for receiving and holding concentrically said nose (22) of the cartridge;

a cap nut (60) with an inside thread (74) for engaging an outside thread (84) of said lip (31) of the housing (30) and with a recess (76) around its opening for slidingly engaging an upper surface (53) of said flange (52) of the cap (50) to provide its fastening to the housing without a rotational movement of said first planar surface (55) of the cap (50) relative to said second planar surface (35) of the housing (30) to prevent abrasive twisting of said O-ring (90);

a spacer ring (40) with a concentric outer surface, to be received in said second recess (39) of the housing (30), and with a plurality of hollow flow-through segments, for holding an upper end of the cartridge (20) concentrically within the housing (30) and for providing a path around the cartridge for a liquid; and a retainer ring (62) with a concentric inside thread (63) for engaging said outside thread (73) on the cap (50) to hold the cap nut (60) slidingly connected to cap (50).

2. The housing assembly of claim 1, wherein said first planar surface (55) of the cap (50) has a first groove (95) and said second planar surface (35) of said first recess (38) of the housing (30) has a matching second groove (94) for forming a first pair of grooves (94,95) having concentric centerlines to accommodate a first O-ring (90) of the same centerline radius.

3. The housing assembly of claim 2, wherein said first pair of grooves (94,95) have concentric centerlines of slightly different radii to provide a tight seal by pressing said first planar surface (55) of the cap against said second planar surface (35) thus pressing said first O-ring (90) against an inner surface of a groove on a first planar surface and against an outer surface of a matching groove on an opposite second planar surface.

4. The housing assembly of claim 3, wherein said first planar surface (55) of the cap (50) has an additional third groove (97) and said second planar surface (35) of said first recess (38) of the housing (30) has an additional matching fourth groove (96) for forming a second pair of grooves (96,97) to accommodate a second O-ring (92), said second pair of grooves being concentric and coplanar with said first pair of grooves (94,95) and having concentric centerlines of slightly different radii and with a radius difference being in the opposite direction from the radius difference of said first pair of grooves (94,95) to provide a tight dual seal by pressing said first planar surface (55) of the cap against said second planar surface (35), thus pressing said first O-ring (90) against an inner surface of a first groove (95) on a first planar surface (55) and against an outer surface of a second groove (94) on a second planar surface (35) and concurrently pressing said second O-ring (92) against an outer surface of a third groove (97) on said first planar surface (55) and against an inner surface of a fourth groove (96) on said second planar surface (35), thus pressing said second O-ring (92) against respective opposite groove surfaces in comparison with said first O-ring (90).

5. The housing assembly of claim 1, wherein said upper annular surface (53) of said flange (52) of cap (50) is shaped like a cone with its apex pointing downward, having an acute angle with the center axis, such that an outer perimeter of said upper annular surface (53) is slightly deformed when engaging said recess (76) of the cap nut (60) to exert axial pressure, evenly distributed around the perimeter, when said inside thread (74) of the cap nut (60) is fastened to said outside thread (84) of said lip (31) of the housing (30).

6. The housing assembly of claim 5, wherein said upper annular surface (36) of said lip (31) of the housing (30) is shaped like a cone with its apex pointing upward, having an acute angle with the center axis, such that an inner perimeter of said upper annular surface (36) is slightly deformed when engaging said lower annular surface (56) of said flange (52) of the cap (50) for forming a tight seal, when said inside thread (74) of the cap nut (60) is fastened to said outside thread (84) of said lip (31) of the housing (30) for a seal improving with higher temperature and higher pressure of a liquid entering the housing (30).

7. The housing assembly of claim 1, wherein the rim of said bottom recess (37) has a zone of S-shaped cross-section with a concave portion (87) and a circular centerline of a radius slightly larger than that of concentric O-rings (24,26) on said nose (22) of the cartridge (20) and with a convex portion (88) for a smooth insertion of said nose (22) of said cartridge (20) into the cylindrical portion of recess (37).

8. The housing assembly of claim 1, wherein the cap (50) has a vent tube (51) of a small diameter and extending into a space between the housing (30) and the cartridge (20), for maintaining a level of the liquid in said housing (30), the vent tube having a very small cross section compared to the cross section of the cartridge (20) for minimizing pressure loss and bypass leakage.

9. A method for temporary sealing of a housing assembly (10) for the filtration of liquids using a replaceable filter cartridge (20), comprising, in combination:

a cup-shaped cap (50) having a flange (52) and a stub (54) at its open end, a cup-shaped housing (30) having an inlet (32) and an outlet (34) with a recess (38) at its open end for receiving said stub (54) of the cap (50) to form a closed sealed cavity, the open end of the housing (30) having a lip (31) with an outside thread (84), and a cap nut (60) having a flat recess (76) around its opening and an inside thread (74), the method comprising the steps of a) providing an upper annular surface (53) of the flange (52) of the cap (50), shaped like a cone with its apex pointing downward;

b) providing a flat lower annular surface (56) of the flange (52) of the cap (50);

c) providing a first annular surface (55) at a mouth of the cap (50) with at least one concentric groove (95) for receiving at least one O-ring (90);

d) providing an annular surface (36) on said lip (31) of the housing (30), shaped like a cone with its apex pointing upward;

e) providing a recess (38) with a second annular surface (35) at said open end of the housing (30), said surface (35) having at least one concentric groove (94) matching said groove (95) for receiving said O-ring (90);

f) sliding the cap nut (60) over the cap (50);

g) fastening the cap (50) to the housing (30) by using said inside thread (74) of the cap nut (60) to engage said outside thread (84) of the lip (31) of the housing (30), thus avoiding a rotational movement of said first annular surface (55) of the cap (50) relative to said second planar surface (35) of the housing (30) to prevent abrasive twisting of said O-ring (90), wherein the outer perimeter of said upper annular surface (53) of said cap flange (52) is slightly deformed when engaging said recess (76) of the cap nut (60) to exert axial pressure evenly distributed around the perimeter and the inner perimeter of said annular surface (36) of said lip (31) of the housing (30) is slightly deformed when engaging said flat lower surface (56) of said flange (52) of the cap (50), the deformation of both perimeters increasing with elevated temperature and pressure of a liquid contained within the housing assembly, for providing a tight seal.

10. The method of claim 9, further improving said temporary sealing by providing a circular seal between a first planar surface (55) of a first part (54) and an opposite second planar surface (35) of a second part (31), comprising the steps of a) providing a first groove (95) with a circular centerline on said first planar surface (55);

b) providing a second groove (94) on said opposite second planar surface (35) with a centerline concentric with the centerline of the first groove (95) but having a slightly different centerline radius, thus forming a first pair of grooves (94,95);

c) putting an O-ring (90) of suitable centerline radius into one groove of said first pair of grooves (94,95);

d) pressing said first planar surface (55) against said second planar surface (35);

such that a tight seal is generated by pressing the O-ring (90) against an inner surface of said first groove on said first planar surface and against an outer surface of said second groove on said opposite second planar surface.

11. The method of claim 10, further improving said circular seal between a first planar surface (55) of a first part (54) and a second opposite concentric planar surface (35) of a second part (31), comprising the steps of a) providing a first groove (95) and a coplanar third groove (97) with concentric circular centerlines on said first planar surface (55);

b) providing a second groove (94) and a coplanar fourth groove (96) with concentric circular centerlines on said second opposite concentric planar surface (35) such that said second groove is concentric with said first groove but having a slightly different centerline radius, thus forming a first pair of grooves (94,95), and such that said fourth groove is concentric with said third groove but having a slightly different centerline radius, thus forming a second pair of grooves (96,97) concentric with said first pair of grooves and with a radius difference in the opposite direction compared to the radius difference of said first pair of grooves;

c) putting a first O-ring (90) of suitable centerline radius into one groove of said first pair of grooves (94,95) and putting a second O-ring (92) of suitable centerline radius into one groove of said second pair of grooves (96,97);

d) pressing said second opposite concentric planar surface (55) against said first planar surface (35) wherein a tight dual seal is generated by pressing said first O-ring (90) against an inner surface of said first groove on said first planar surface and against an outer surface of said second groove on said second opposite concentric planar surface of said first pair of grooves (94,95) and by concurrently pressing said second O-ring (92) against an outer surface of said third groove on said first planar surface and against an inner surface of said fourth groove on said second opposite concentric planar surface of said second pair of grooves (96,97).

* * * * *